United States Patent
Narad et al.

(10) Patent No.: US 7,761,666 B2
(45) Date of Patent: Jul. 20, 2010

(54) TEMPORALLY RELEVANT DATA PLACEMENT

(75) Inventors: Charles Narad, Los Altos, CA (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 11/588,585

(22) Filed: Oct. 26, 2006

(65) Prior Publication Data

US 2008/0104325 A1    May 1, 2008

(51) Int. Cl.
*G06F 12/08* (2006.01)
(52) U.S. Cl. .................. 711/137; 711/122; 709/223
(58) Field of Classification Search .................. None
See application file for complete search history.

(56) References Cited

U.S. PATENT DOCUMENTS

| | | | | |
|---|---|---|---|---|
| 4,616,338 A | * | 10/1986 | Helen et al. ................ 710/53 |
| 5,305,389 A | * | 4/1994 | Palmer ..................... 382/305 |
| 5,361,391 A | * | 11/1994 | Westberg ................... 711/137 |
| 5,721,865 A | | 2/1998 | Shintani et al. |
| 6,370,622 B1 | * | 4/2002 | Chiou et al. ................ 711/146 |
| 6,678,795 B1 | * | 1/2004 | Moreno et al. ............. 711/137 |
| 6,711,651 B1 | * | 3/2004 | Moreno et al. ............. 711/141 |
| 6,957,304 B2 | * | 10/2005 | Wilkerson .................. 711/137 |
| 2003/0061332 A1 | | 3/2003 | Narad et al. |
| 2003/0107389 A1 | | 6/2003 | Lyford |
| 2004/0199727 A1 | | 10/2004 | Narad |
| 2005/0027941 A1 | * | 2/2005 | Wang et al. ................ 711/121 |
| 2005/0071572 A1 | * | 3/2005 | Nakashima et al. ........ 711/137 |
| 2006/0136671 A1 | | 6/2006 | Balakrishnan et al. |
| 2006/0224860 A1 | * | 10/2006 | Colavin et al. ............. 712/207 |
| 2008/0005443 A1 | * | 1/2008 | Matsuzaki ................. 710/308 |

* cited by examiner

*Primary Examiner*—Matt Kim
*Assistant Examiner*—Kaushikkumar Patel
(74) *Attorney, Agent, or Firm*—Blakely, Sokoloff, Taylor & Zafman LLP

(57) ABSTRACT

A method and apparatus for placement of temporary relevant data are disclosed. In one embodiment, the apparatus comprising one or more memories through which a producer provides data for access by a consumer in a memory-based producer-consumer relationship, and an agent to monitor access by the producer and consumer to the one or more memories and to direct placement of produced data into at least one of the one or more memories that is closer to the consumer, wherein placement occurs at a time determined by the agent.

15 Claims, 5 Drawing Sheets

TEMPORALLY RELEVANT DATA PLACEMENT

FIELD

Embodiments of the present invention relate to the field of data management in computer systems; more particularly, embodiments of the present invention relate to coordinating transfer of data into a memory (e.g., a cache memory) to reduce cache miss latency and/or other latency problems.

BACKGROUND

Data producer-consumer techniques sometimes use a memory-based producer-consumer communication channel. When a producer and consumer do not operate synchronously, a queue may be used as a communications mechanism between them to absorb temporary differences between production and consumption. This buffering provided by the queue may be termed "elasticity". Elasticity is needed when for example the queue contains received network packets and certain packets take longer to process than others; that is, processing is not synchronous (in "lockstep") with arrival rate. Elasticity also addresses buffering of data. For example, large packets may require more storage space in the queue than small packets. A computer system or other system implementing a producer-consumer channel may have a memory hierarchy comprising a plurality of memories, generally of inversely proportional speed and capacity, wherein smaller and faster memories are closer in time to a memory accessor and larger and slower memories are farther away. In general the smaller and faster memories may be used to implement some sort of cache. Data migration techniques (e.g., external cache allocation ("cache push" and prefetch) may be used to move data closer to the eventual consumer, but can lose their effectiveness when the target cache is not large enough to store the pending (elastic) data until the consumer can accept it.

A producer-consumer model may be similar to that of a FIFO buffer, such as one implemented as a ring data structure in memory. A ring consists of a range of memory locations, a produce pointer (tail) used to add new items to the list, a consume pointer (head) used to identify the next valid item to remove from the list, and some communication mechanism between the producer and consumer to communicate that items have been added and removed from the ring. There may be also implicitly or explicitly some flow control mechanism. Another model is a linked list where the producer appends new entries to the tail of a list and the consumer removes entries from the head of the list. In this case, as with the FIFO buffer, there may be a mechanism for communicating when new entries have been added, but less need for flow control since the producer is limited only by the available free records to allocate and append to the list.

The producer and the consumer can each be fixed-function units communicating through a memory-based queue. Each may also be a programmable processing element such as a central processing unit (CPU), and further may have a cache used to hide memory access latency. A major performance bottleneck in using memory-based producer-consumer communication channels involving systems with caches is the cache misses taken at the consumer each time newly produced information is accessed by the consumer for the first time, also known as "compulsory cache misses". Previously proposed mechanisms that attempt to address this include external push delivery into a cache and external prefetch hints ("Direct Cache Access" or DCA) that cause a cache to pull in data prior to the actual CPU demand for it. In the case of an external push, data is sent to the cache before it is requested by the consumer. In the case of an external prefetch hint of DCA, instead of a cache push, the cache is given a hint suggesting that it prefetch certain data before the consumer requests it. For more information, see U.S. patent application Ser. No. 10/406,798, entitled "Cache Allocation," filed Apr. 2, 2003 (Publication No. 2004-0199727) and U.S. patent application Ser. No. 11/021,143, entitled "Software Controlled Dynamic Push Cache," filed Dec. 22, 2004 (Publication No. 2006-0136671). These mechanisms take advantage of knowledge at the producer that the specific data will be relevant to the consumer in the near term, and strive to get data closer (that is, with lower average miss cost) to the consumer prior to the consumer being aware of, and accessing, the data.

There are a number of limitations to the current approaches. Push delivery can suffer from this elasticity problem (insufficient capacity for transient buffer growth) due to the small capacity of the lower level (closer) caches and the potential for variable processing time per packet, the upshot of which is that newly arrived data being pushed into a particular cache may displace older and more immediately relevant data that was previously pushed into that cache but is not yet processed (consumed). At the same time such "flooding" of the cache with pushes might displace the working set of other data that the processor has brought into its caches (that is, causing an increase in random victimization of cache lines). This results in increased traffic to DRAM and high miss latency when the data is finally accessed if the elasticity of the cache(s) was exceeded. Publication No. US 2003-0107389A1 describes a mechanism for cooperative throttling of push, wherein the consumer and the producer cooperatively implemented mechanisms to throttle pushing (instead spilling data to main memory or holding it in a large producer-local buffer) when the system determined by various means that push was less effective or even counter-productive.

External prefetch hints are also subject to such "cache flooding" in which prefetched data displaces previously placed data. Another limit for external prefetch hints is that a cache has limited resources to queue up pending activities. In general, a prefetch hint is given the lowest priority among pending cache requests waiting for access to the system, and prefetch hints can be safely dropped since doing so does not affect correct functionality, only performance. In order to avoid complex and counter-productive flow-control mechanisms, externally generated prefetch hints are likely to be implemented as "fire-and-forget" operations for the sender and will only be accepted by the cache if there is space in a hardware queue to hold these requests. A cache also might drop a prefetch hint that has remained unserviced for a long time due to contention with higher priority requests for resources or for some other reason. Thus, the hint might be dropped because of a lack of space in the request queue, or due to contention for cache processing cycles. Both of these effects are due to policies that are at the microarchitecture level of the cache and are independent of progress by the consumer in processing the pending list entries. This means that the likelihood of an external prefetch hint successfully being processed by the target cache is subject to microarchitecture factors unrelated to channel-level flow control elasticity. For this reason, the achievable benefit from DCA is unpredictable.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
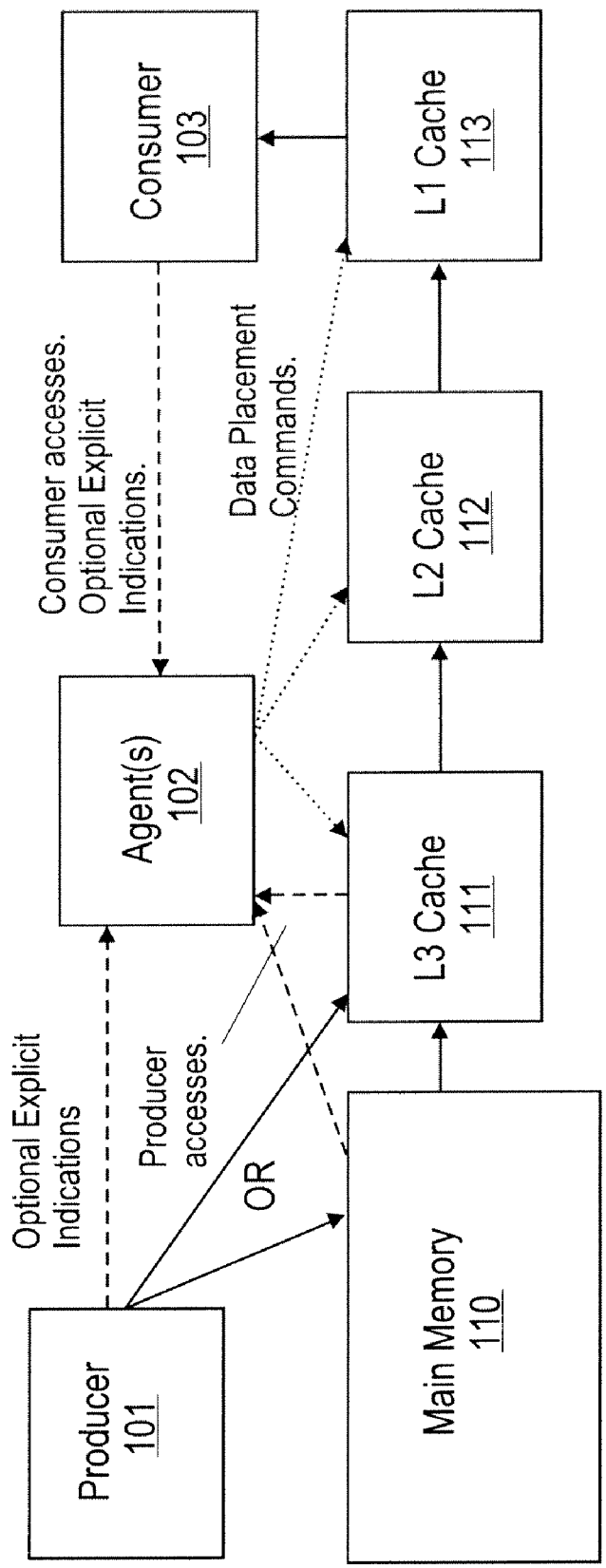
FIG. 1 is a block diagram of a computer system, in which at least one embodiment may be used.

Techniques are disclosed for overcoming problems of memory-based producer-consumer relationships. In one embodiment, these techniques handle the increasing mismatch between the processing speed of a central processing unit (CPU) and the cost of accessing data produced into coherent memory by another agent (e.g., input/output (I/O) device, another CPU, etc.). Embodiments may be used in conjunction with dense multi-core processors where bus/memory contention and snoop contention among the many cores leads to increased latency to service a cache miss.

In one embodiment, a memory-based producer-consumer relationship, an intelligent third party agent monitors activity by the producer and the consumer and externally directs placement of incoming data into some level(s) of cache memory in a fashion such that cache miss latency is reduced or eliminated for the consumer, while data is not placed so far in advance that it might "flood" the cache and displace more temporally relevant data previously pushed or pulled into that cache. In one embodiment, an agent may monitor accesses to the memory-based communication channel between a producer and a consumer and store soon-to-be-accessed data for the consumer in a lower-latency memory structure closer to the consumer a short time ahead of the time it will be needed, in order to avoid victimizing useful data already stored or subsequently placed therein. The techniques described herein may be applied to FIFO/ring and linked-list communication and to other producer-consumer mechanisms apart from those involving a CPU of a computer system.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Producer-consumer relationships may be defined in terms of the data structures (e.g., rings) used in the communication between the two in terms of either pointers or counts that indicate the producer has a number of data items for the consumer. Techniques for monitoring producer-consumer communications and placing data in a timely manner are described. In the techniques, a third party agent may monitor the producer-consumer communications and place or direct placement of the data in a manner to facilitate improved performance over prior art techniques.

Note for purposes herein, each producer and consumer may comprise a module, unit, agent, device, integrated circuit, etc., that is operable to transmit and/or receive data. As such, these may include processors, controllers, bridges, memory devices, etc.

In one embodiment, the third party agent may recognize progress by the producer in generating entries in the communications data structure (e.g., a linked list, a ring, etc.) and the consumer in removing (processing) those entries from the data structure and may cause data to be placed closer to the eventual consumer prior to the time that the data will first be accessed by the consumer, but not so far in advance that the amount of data placed but not yet consumed reduces the performance of communications through the data structure. In one embodiment, based on the information indicative of both the producer's progress and the consumer's progress, the agent is able to have recently generated data in the communications data structure moved to a lower latency memory, which is closer to the receiving agent at an appropriate time. "Temporal relevance", may be used to describe a situation, in which the data is not evicted before it is used and it is not stored too late, such that a consuming agent may gain a substantial benefit of the data being stored in a lower-latency memory structure, which is closer to the consuming agent in proximity. In one embodiment, the memory structure is not closer to the consuming agent in proximity, however, the lower-latency characteristic of the memory structure provides the consumer with a benefit of being able to receive the data sooner. In one embodiment, the data is guaranteed to be in the cache at the time it is accessed by the consumer. In another embodiment, the third party agent significant increases the probability that the data will be in the cache when the consumer accesses it.

In one embodiment, the producer-consumer communications occur in a computer system having one or more memories (e.g., data structures such as one or more levels of cache memories, DRAM, etc.). It is through these memories that a producer acts as a sender to provide data for access by a consumer, or a receiver, in a memory-based producer-consumer relationship. The producer generates data into the memory in a known fashion, and the consumer of the data accesses data in a known fashion. In one embodiment, the consumer accesses data by sequentially traversing through entries in a ring data structure. In another embodiment, the consumer accesses data by following a linked list.

The producer and consumer components may be a variety of components in a computer system such as, for example, but not limited to, a pair of processors, a processor and an input/output (I/O) device (e.g., network interface controller (NIC)), a processor and a coprocessor (e.g., an encryption unit), a pair of coprocessors (e.g., a video encoder producing data to be consumed by an encryption unit) and a pair of I/O devices (e.g., communications processors). The third party agent monitors access by the producer and consumer components to the one or more memories and causes an external direct placement of incoming data into at least one of the these memories that is closer to the consumer component at the time of placement by the agent than requested by the consumer component. Thus, the third party agent monitors the sender of data and the receiver of data to determine, based on their condition, when to move data into a memory that is closer to the receiver.

In one embodiment, the third party agent uses the information obtained from monitoring the sender and the receiver, and then determines the correct time to issue prefetch hints or explicit push operation commands to move data closer to the consumer before the consumer requests the data. Specifically, the agent issues prefetches or pushes at an optimal time to try to get their full benefit such that they are early enough to fully hide the latency of farther memories when the consumer accesses the data, while not too far in advance to displace data that is more meaningful sooner nor issued too far in advance to have the data that is moved into the cache be evicted before it is used. Thus, the agent acts as a prefetcher that operates and interacts with the producer-consumer relationship. In one embodiment, the consumer is a multi-threaded processor, and the third party agent may represent a thread that operates as a prefetcher. This will be described in more detail below.

An Example of the Producer-Consumer Relationship

In one embodiment, memories or other storage structures used for producer-consumer communication include one or more levels of cache memory, system memory, or other memory. In one embodiment, an agent may directly store the data in a memory in a manner that reduces, or possibly eliminates, cache miss latency for the consumer component while avoiding displacement of more temporarily relevant data in a cache memory due to flooding of the cache memory. This may occur by having the agent place data into a lower level cache memory prior to the time the data will first be accessed by the consumer component without placing the data into the lower level cache memory so far in advance of being consumed that performance with respect to the use of the cache memory is reduced.

In one embodiment, for the levels of a cache hierarchy with Level 1 (L1) being closest to the CPU core, a producer of data might write the data into main memory or into a high level (farther from the CPU) cache such as, for example, the L3 cache or the L4 cache. The main memory or high level cache is larger, slower and farther away (that is, has a higher cache miss cost) from the CPU core and has a larger capacity than the L1 cache. The destination for the data from the producer is selected such that it has sufficient capacity to provide the necessary elasticity for this producer-consumer communication channel. If the destination is a cache, then the producer might use a mechanism such as push or DCA to cause the produced data to be placed in that cache. A push into a cache allows the data to avoid being first written and then read from external dynamic random access memory (DRAM). This reduces average contention and power consumption for DRAM accesses.

FIG. 1 illustrates one embodiment of a system in which a third party agent monitors and controls the data placement with respect to a producer-consumer relationship in a computer system. In one embodiment, the system may contain memory 110 to provide data to L3 cache memory 111, which forwards data to L2 cache memory 112, which forwards data onto L1 cache memory 113. As data is displaced from a lower-level cache or at certain other times with modified locations, it may, if different from the content of the corresponding location in a higher-level cache or main memory, overwrite the higher-level copy. In certain cache coherency protocols where higher level caches are not necessarily inclusive of the contents of lower level caches, then cache blocks may be written into a higher-level cache from a lower-level cache.

Producer 101 provides data to main memory 110 or can in this example push data into L3 cache memory 111. Consumer 103 obtains data from L1 cache memory 113. In response to the monitoring of producer 101 and consumer 103, agent 102 issues data placement commands to have data placed in either L3 cache memory 111, L2 cache memory 112 or L1 cache memory 113. The data may be obtained by agent 102 from memory 110 or L3 cache memory 111 after producer 101 pushes the data to these locations or may be placed by other components or other agents operating in response to commands from agent 102. In one embodiment, agent 102 places the data so that it has temporal relevance. In one embodiment, agent 102 makes a single placement of data from a source such as main memory 110 or L3 cache memory 111 into a destination such as L3 cache memory 111, L2 cache memory 112 or L1 cache memory 113. In another embodiment, agent 102 issues a series of commands to iteratively move the data from a farther memory to a closer memory. In one embodiment, for example, after producer 101 has written data into main memory 110, at a later time monitoring agent 102 issues a data placement command to move the data to L3 cache memory 111, and then again later monitoring agent 102 issues another data placement command to move the data to L2 cache memory 112.

In one embodiment, the final destination (location closest to the consumer) that this agent directs data to might be a cache such as, for example, an L2 shared cache or an L1 data cache. The locations selected in that cache to contain the delivered data may be part of the cache's general pool, or it might be a portion of the cache configured or dedicated for this purpose. In one embodiment, the destination is a dedicated resource that exists for this purpose.

In one embodiment, the agent is transparent to either or both of the producer and consumer components. In another embodiment, the agent is part of the consumer component. For example, the agent may comprise a first thread running on the consumer component while a second thread running on the consumer component consumes the data. In another embodiment, that first thread may appear as a consumer for the producer and appear as a producer for the consumer in order to reveal the presence of new data only after data placement commands have been issued.

Many mechanisms could be used to give the data placement agent the necessary insight into communication progress. In one embodiment, the agent autonomously monitors accesses by either or both the producer and consumer to pre-configured data structures in memory and uses that information to determine the timeliness of data to deliver. In another embodiment, the agent receives explicit progress indications from the consumer and from the producer to help the agent determine when to issue data placement commands. In one embodiment, either the producer or the consumer exclusively sends the agent explicit commands while the agent monitors data structure accesses to obtain information about the other. In one embodiment, if the placement destination is of rigidly fixed size, the consumer indicates the amount of available space to the placement agent using, for example, a credit signaling mechanism.

In another embodiment, the agent acts as a "proxy" for the producer and consumer components, intercepting or explicitly receiving queue progress indications (such as, for example, pointer updates and/or credit updates) from the producer-to-consumer and from consumer-to-producer, using them to drive data migration, and then mimicking the sending of the progress information at a time of the agent's choosing.

In an embodiment in which the agent uses externally directed prefetches, the agent may also monitor cache activity indicators in order to determine when to issue prefetch hints with the best chances of success.

In one embodiment, the agent manages staging of data among a hierarchy of cache memories. That is, the agent might choose to copy data into a level N-1 cache based on some criteria, then to migrate the data from there to an N-2 level cache based on some different criteria at a later time, etc. Alternatively, each level of cache-to-cache migration might be handled by a different agent specific to that level. In another embodiment, the agent may skip one or more levels of cache when migrating data, for example issuing data placement commands to migrate data from level N to level N-2. In such an embodiment, the policy of which level to migrate data to in a particular instance may be a fixed policy or may adapt dynamically based on information about system conditions.

In one embodiment, the agent participates in a plurality of communications channels which share some or all of the cache and memory resources in the system, and prioritizes data migrations among the several channels based. Alternatively, the data and/or the channels have an indication of relative priority used by the agent to implement prioritization.

Benefits of one or more embodiments of the invention include that data is staged downward through a hierarchy of caches in a timely manner, so that the eventual initial access by the consumer has a very low cost while cache flooding is avoided. In addition, the data avoids an unnecessary trip to DRAM prior to being accessed by the consumer, which saves memory bandwidth and contention and also reduces power.

Another Example of a Producer-Consumer Relationship

In one embodiment, the third party agent is a thread in a multi-threaded processor that acts as an agent 102 by interposing itself between the NIC and the receive portion of the device driver. The thread may be a hardware thread or a software thread. An example of this may be shown in FIG. 2 in which a device driver 200 communicates with a network interface controller (NIC) 208 in a computer system with transmit and receive data rings between the two. Alternatively, any form of memory may be used to interface the device driver to the NIC.

Figure 2:
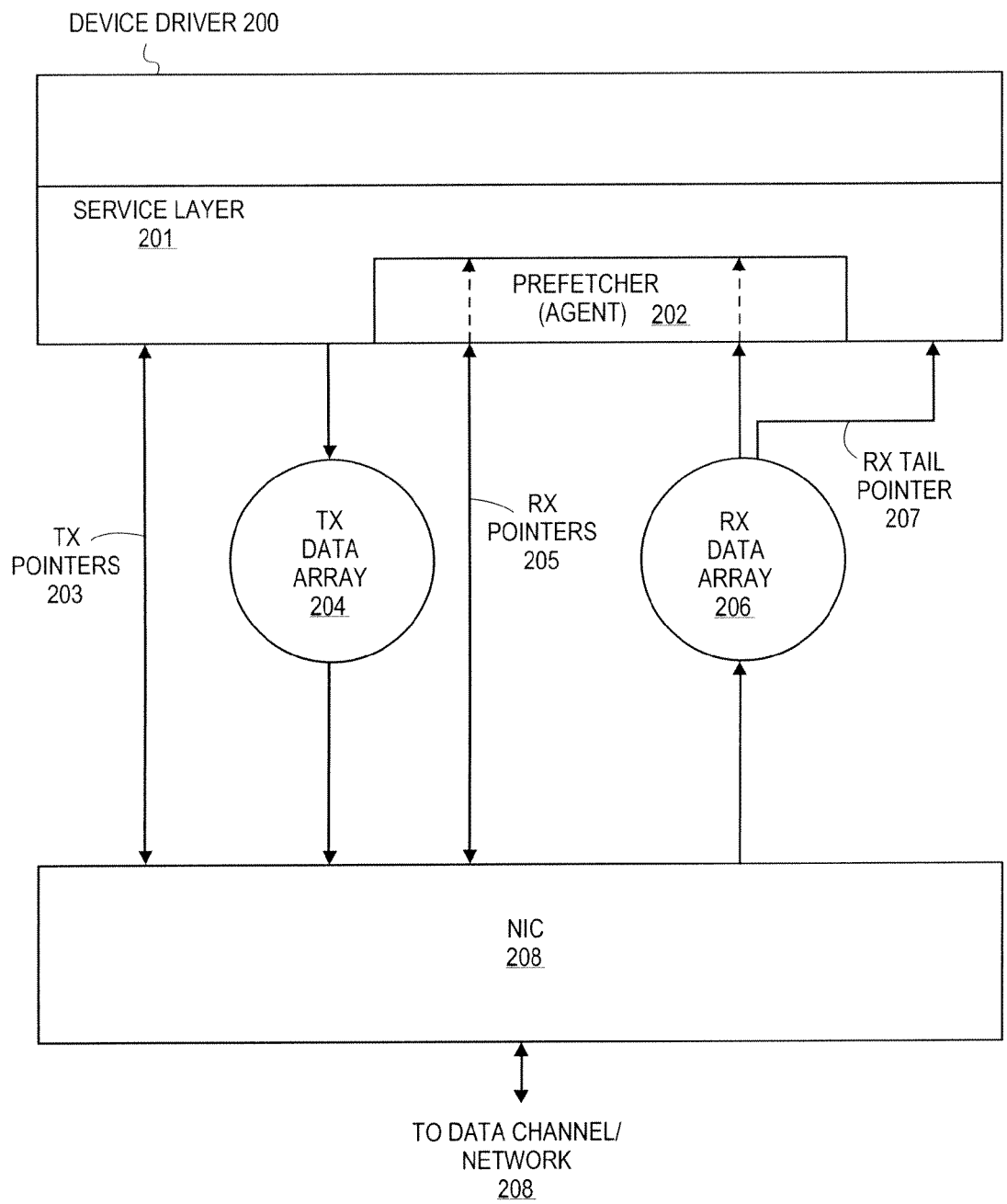
FIG. 2 is another block diagram of a portion of a computer system, in which at least one embodiment may be used.
Figure 3:
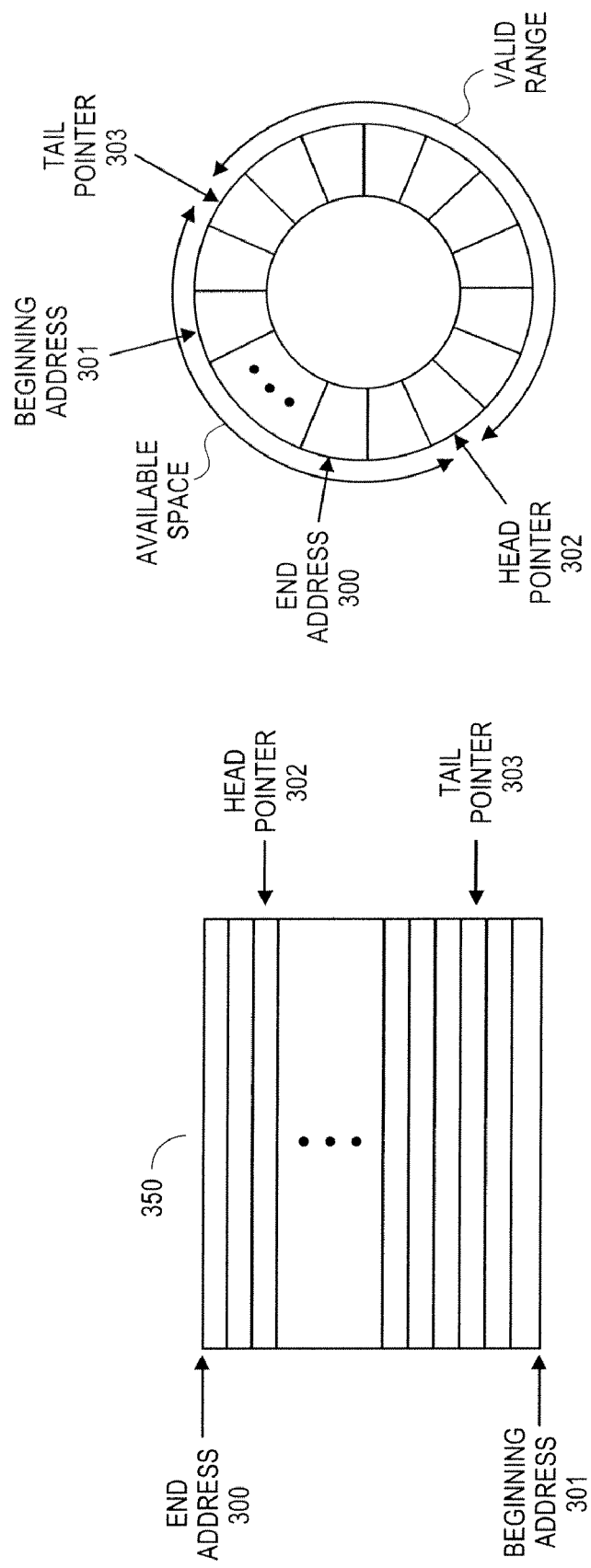
FIG. 3A illustrates a linear array of memory locations, in accordance with one embodiment of the invention.
FIG. 3B illustrates a ring data structure, according to one embodiment of the invention.

Referring to FIG. 2, with respect to the rings, the consumer keeps pulling data off at the head of the ring, while the producer adds more data at the tail of the ring. For the transmit ring (e.g., transmit data array 204), the device driver 200 is the producer and the NIC 208 is the consumer, while for the receive ring (e.g., receive data array 206), the reverse is true. A ring data structure in memory comprises a linear array of memory locations (e.g., the linear array 350 of FIG. 3A) to hold ring entries, plus a head pointer (e.g., 302 of FIGS. 3A and B) which indicates the location in the array of the oldest item and thus next to be consumed in the queue and a tail pointer (e.g., 303 of FIGS. 3A and B) which indicates the next location in the array (350) to be written into, representing the tail of the queue. As entries are written to or consumed from the queue, the tail pointer 303 and head pointer 302 (respectively) are incremented to indicate the production or consumption of an entry. When an incremented pointer gets to the end of the linear array (end address 300 of array 350), it wraps back to the start of the array (beginning address 301 of array 350), thus implementing a circular or ring buffer in the memory. By evaluating the distance between the head pointer (302) and the tail pointer (303), the producer can determine if there is space for a new entry, and the consumer can determine if the queue is non-empty. Typically, the tail pointer (302) is read by the consumer and is read and written by the producer, while the head pointer (303) is read by the producer and is both written and read by the consumer. Alternatively, the head pointer (303) is private to the consumer and the tail pointer (302) is private to the producer, and credits are passed back and forth individually or in batches to enable each to determine the relative positions of the pointers. The ring data structure in this case also contains credit indications. While the two described methods are commonly used, there are many well-known variations and optimizations for ring operations.

A service interface for a NIC is the interface between the NIC and a device driver. The service interface comprises receive and transmit rings in memory, signaling mechanisms such as interrupts, and other device management interfaces such as control and status registers. In standard operation, the NIC places transmit packets and descriptors onto a transmit ring and consumes receive packets and their associated descriptors from a receive ring.

In one embodiment, a processor thread operates as a prefetcher, referred to as a prefetch proxy thread, or prefetcher agent 202. In one embodiment, for receive operations the thread mimics the driver 200 as far as the NIC 208 is concerned and mimics the NIC 208 as far as the device driver 200 is concerned. In this embodiment, for receive there is a producer-interceptor relationship between the NIC 208 and the agent 202, and a producer-consumer relationship between the agent 202 and the device driver 200.

The device driver 200 includes service layer 201. Service layer 201 interfaces, along with prefetcher agent 202, to the NIC 208 via a transmit data array 204 used to provide data from device driver 200 to the NIC 208 and receive data array 206 used to provide data from the NIC 208 to the device driver 200. Head and tail pointers corresponding to the transmit data array 204 are sent between the service layer 201 and the NIC 208 via interconnect 203. Similarly, head and tail pointers corresponding to the receive data array 206 are sent between the prefetcher agent 202 and the NIC 208 via interconnect 205. Interconnect 205 is also used to send interrupts from the NIC 208 to the prefetcher agent 202; although it is not necessary that such interrupts share the same interconnect with the receive head and tail pointers.

While in prior art the head and tail pointers were used to communicate between the NIC 208 and the device driver 200, in this embodiment, there is an additional pointer used by the prefetcher agent 202 to keep track of previously issued prefetches referred to as a prefetch tracking pointer, and a produce pointer written by the thread 202 and read by the device driver 200 referred to as the proxy produce pointer which is used to make newly-produced data visible to the device driver 200 at some time after a prefetch has been issued for the data. Interrupts from the NIC 208, which are sent along with receive tail and head pointers on interconnect 205, are handled by the agent 202, and the agent 202 generates signals equivalent to device interrupts to the device driver 200. As the NIC 208 produces entries into a receive ring, the interrupts indicating this are handled by the prefetcher agent 202 (proxy thread), whereas in prior art the interrupts are handled by the device driver 200.

In response to indications such as interrupts from the NIC 208 received on interconnect 205, the prefetcher agent 202 (proxy thread) observes what new entries have been produced into the ring since the last time it responded to an interrupt and issues prefetch commands to move the newly produced data into a cache that is used by the device driver 200, such as an L2 shared cache or L1 data cache. The prefetcher agent 202 (proxy thread) increments the prefetch tracking pointer to keep track of which entries have had prefetch commands issued. This is equivalent to a consumer indicating that data has been consumed, except that the producer (NIC 208) is not aware of any change in state. At some later time, the prefetcher agent 202 (proxy thread) copies the prefetch tracking pointer to the proxy produce pointer which is observed by the device driver 200, and signals to the device driver 200 that there are entries on the ring. The device driver 200 services this signal in the same manner as in prior art, with the exception that it sees the proxy produce pointer rather than the NIC's produce pointer. The device driver 200 accesses data in the ring as in prior art, and upon consuming entries it increments the head pointer appropriately, signaling to the NIC 208 that the data has been consumed from the ring. Alternatively, the prefetcher agent 202 (proxy thread) stores interim values of the tracking pointer and uses interim values to indicate to the device driver 200 some but not all of the entries for which prefetch commands have been issued. It should be apparent to one skilled in the art that a similar mechanism can be applied to a credit-based communication channel and other similar communications mechanisms.

Therefore, the driver 200 sees only information that is in the memory. Its visibility is limited to the data that has been prefetched for it. This prefetching proxy thread, prefetcher agent 202 watches the producer and monitors how quickly the data is being consumed by the consumer, and based on these makes decisions about when to prefetch data into the selected cache. After prefetching data, the prefetcher layer 202 notifies the driver 200 that data is available.

Inter-processor communication (IPC) may use the prefetch helper thread model in processor-to-processor based producer-consumer arrangements.

Alternative Embodiments

In one embodiment, the agent has additional and related responsibilities. In one embodiment, the agent intelligently aggregates small transactions to improve, and optimize transport efficiency through the system. In one embodiment, the agent anticipates or recognizes a traversal of a linked list, hash table, or other data structure and prefetches likely locations to be accessed in that traversal.

In one embodiment, the agent is a centrally located and shared resource. In one embodiment, the agent is affiliated with a particular consumer or producer. There may be a multiplicity of homogeneous or heterogeneous agents distributed throughout a system, working either cooperatively or independently.

In one embodiment, the push of data by the I/O agents into the outermost level of cache may be into locked or specially reserved regions of that cache such that the data will not go to external DRAM until after it has been migrated towards the consumer.

The destination for the data from the producer is selected to provide a necessary elasticity.

Embodiments of the invention may be implemented in a variety of electronic devices and logic circuits. Furthermore, devices or circuits that include embodiments of the invention may be included within a variety of computer systems, including a point-to-point (p2p) computer system and shared bus computer systems. Embodiments of the invention may also be included in other computer system topologies and architectures.

Figure 4:
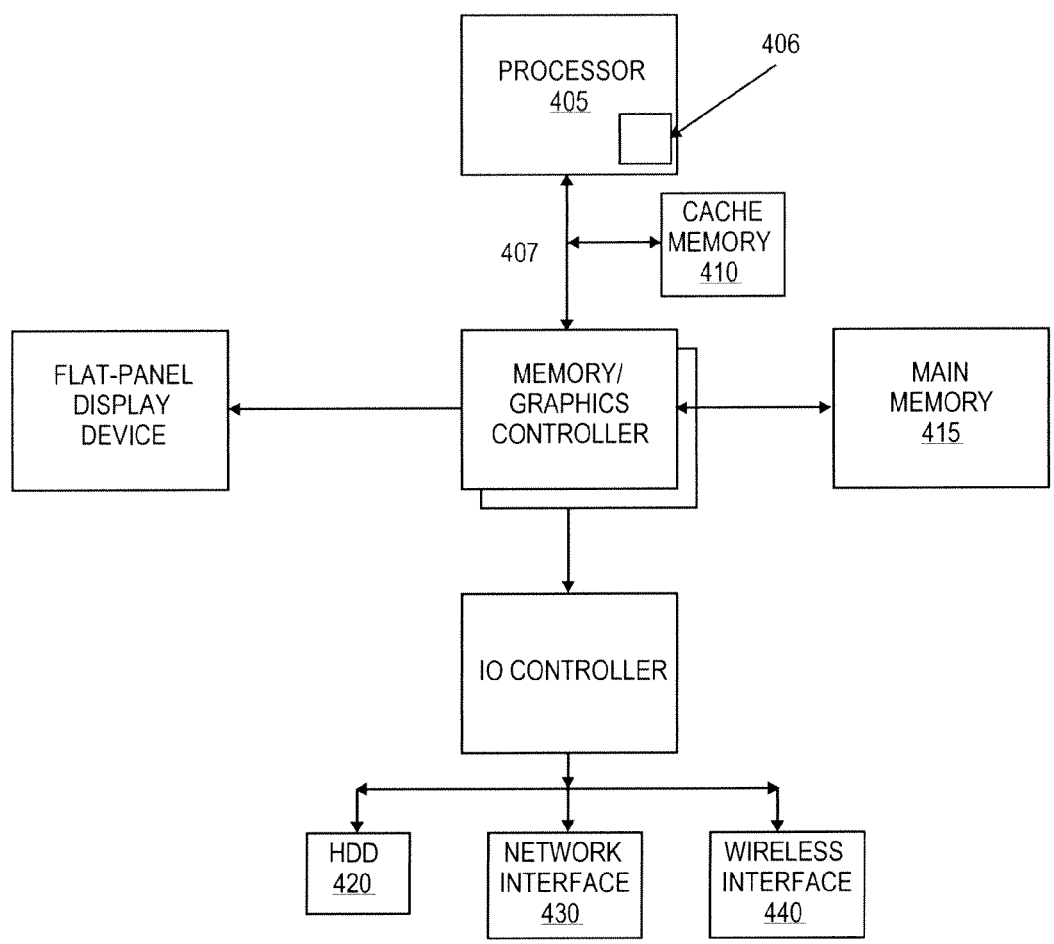
FIG. 4 illustrates a shared bus computer system in which one embodiment of the invention may be used.

FIG. 4, for example, illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is one embodiment of the invention 406. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 or via wireless interface 440 containing various storage devices and technologies. The cache memory may be located either within the processor or in close proximity to the processor, such as on the processor's local bus 407. Furthermore, the cache memory may contain relatively fast memory cells, such as a six-transistor (6T) cell, or other memory cell of approximately equal or faster access speed.

The computer system of FIG. 4 may be a point-to-point (PtP) network of bus agents, such as microprocessors, that communicate via bus signals dedicated to each agent on the PtP network. Within, or at least associated with, each bus agent may be at least one embodiment of invention 406, Alternatively, an embodiment of the invention may be located or associated with only one of the bus agents of FIG. 4, or in fewer than all of the bus agents of FIG. 4.

Figure 5:
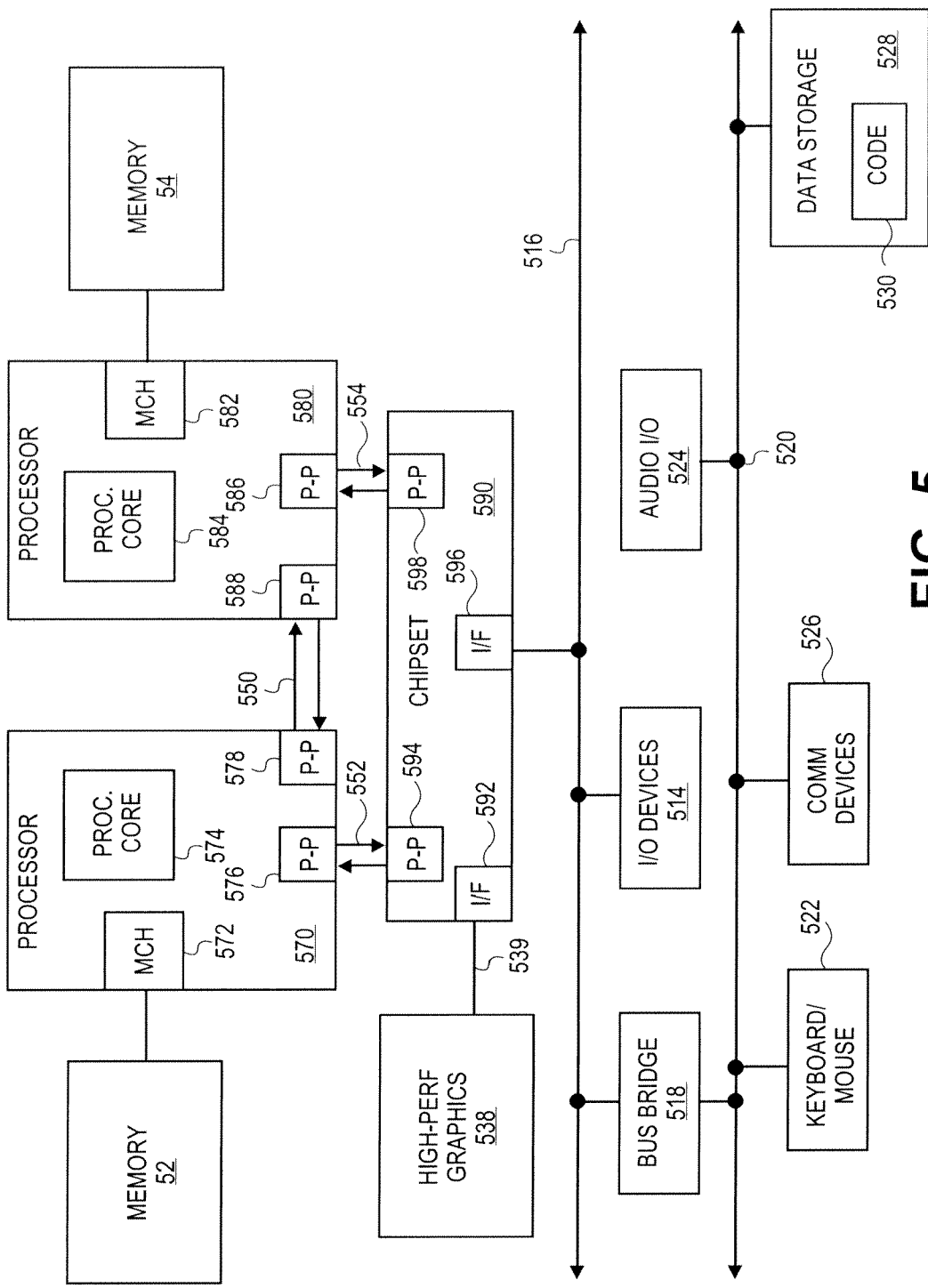
FIG. 5 illustrates a point-to-point computer system in which one embodiment of the invention may be used.

Similarly, at least one embodiment may be implemented within a point-to-point computer system. FIG. 5, for example, illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 570, 580 are shown for clarity. Processors 570, 580 may each include a local memory controller hub (MCH) 572, 582 to connect with memory 52, 54. Processors 570, 580 may exchange data via a point-to-point (PtP) interface 550 using PtP interface circuits 578, 588. Processors 570, 580 may each exchange data with a chipset 590 via individual PtP interfaces 552, 554 using point to point interface circuits 576, 594, 586, 598. Chipset 590 may also exchange data with a high-performance graphics circuit 338 via a high-performance graphics interface 539. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
    a consumer agent connected to a producer agent;
    a monitor agent to monitor producer agent-consumer agent communications, the communications including memory accesses being performed access by the producer agent or the consumer agent;
    the monitor agent is further to cause data to be moved, at a time determined by the monitor agent and not as part of a request from the consumer agent, from a first memory to a second memory that is accessible by the consumer agent with less latency than the first memory; and
    the monitor agent is further to recognize progress made by the producer agent in generating data entries in a data structure and further to recognize progress made by the consumer agent in removing the data entries from the data structure, wherein causing the data to be moved includes, based on the producer agent progress and the consumer agent progress, moving recently-generated data entries in the data structure to a lower latency memory appropriately in time for a next consumer agent to use the recently-generated entries without causing additional latency in a consumer data structure.

2. The apparatus defined in claim 1 wherein the first and second memories include first and second levels of cache memory.

3. The apparatus defined in claim 1 wherein the monitor agent is transparent to one or both of the producer agent and the consumer agent and autonomously monitors access by at least one of the producer agent and the consumer agent to the data structure and uses that information to determine when to move the recently-generated data entries closer to the next consumer agent.

4. The apparatus defined in claim 3 wherein the monitor agent monitors cache activity indicators to determine when to issue prefetch hints to cause an externally directed prefetch to move the recently-generated data entries closer to the next consumer agent.

5. The apparatus defined in claim 1 wherein the monitor agent is transparent to one of the producer agent and consumer agent and autonomously monitors access by at least one of the producer agent and consumer agent to the data structure, and receives indications from the producer agent and the consumer agent and uses that information to determine when to move the recently-generated data entries closer to the next consumer agent.

6. The apparatus defined in claim 1 wherein the monitor agent is part of the consumer agent.

7. A method comprising:
    monitoring, via a monitor agent, producer agent-consumer agent communications, the communications including memory accesses access being performed by a producer agent or a consumer agent;
    causing, via the monitor agent, data to be moved, at a time determined by the monitor agent and not as part of a request from the consumer agent, from a first memory to a second memory that is accessible by the consumer agent with less latency than the first memory; and
    recognizing progress made by the producer agent in generating data entries in a data structure and further recognizing progress made by the consumer agent in removing the data entries from the data structure, wherein causing the data to be moved includes, based on the producer agent progress and the consumer agent progress, moving recently-generated data entries in the data structure to a lower latency memory appropriately in time for a next consumer agent to use the recently-generated entries without causing additional latency in a consumer data structure.

8. The method defined in claim 7 wherein the first and second memories include first and second levels of cache memory.

9. The method defined in claim 7 wherein the monitor agent is part of the consumer agent.

10. A non-transitory machine-readable storage medium comprising instructions which:
when executed: cause a machine to monitor producer agent-consumer agent communications, the communications including memory accesses being performed monitoring access by a producer agent or a consumer agent;
cause the data to be moved, at a time determined by the monitor agent and not as part of a request from the consumer agent, from a first memory to a second memory that is accessible by the consumer agent with less latency than the first memory; and recognize progress made by the producer agent in generating data entries in a data structure and further to recognize progress made by the consumer agent in removing the data entries from the data structure, wherein causing the data to be moved includes, based on the producer agent progress and the consumer agent progress, moving recently-generated data entries in the data structure to a lower latency memory appropriately in time for a next consumer agent to use the recently-generated entries without causing additional latency in a consumer data structure.

11. The machine-readable storage medium defined in claim 10 wherein explicit indications from the consumer agent indicate an amount of memory space available to the monitor agent.

12. The machine-readable storage medium defined in claim 10 wherein the first and second memories includes first and second ring data structures.

13. A system comprising:
a producer agent including a first processing agent to produce;
a consumer agent including a second processing agent to consume the data;
a monitor agent to monitor producer agent-consumer agent communications, the communications including memory accesses being performed by the producer agent or the consumer agent;
the monitor agent is further to cause data to be moved, at a time determined by the monitor agent and not as part of a request from the second processing agent, from a first memory to a second memory that is accessible by the consumer agent with less latency than the first memory; and
the monitor agent is further to recognize progress made by the producer agent in generating data entries in a data structure and further to recognize progress made by the consumer agent in removing the data entries from the data structure, wherein causing the data to be moved includes, based on the producer agent progress and the consumer agent progress, moving recently-generated data entries in the data structure to a lower latency memory appropriately in time for a next consumer agent to use the recently-generated entries without causing additional latency in a consumer data structure.

14. The system defined in claim 13 wherein the producer agent comprises a network interface controller (NIC).

15. The system defined in claim 13 wherein the consumer agent comprises a processor.

* * * * *